(12) United States Patent
Deng et al.

(10) Patent No.: US 11,271,442 B2
(45) Date of Patent: Mar. 8, 2022

(54) WIRELESS CHARGING PROMPT METHOD AND DEVICE, WIRELESS CHARGING SYSTEM

(71) Applicant: BOE TECHNOLOGY GROUP CO., LTD., Beijing (CN)

(72) Inventors: Wei Deng, Beijing (CN); Jun Yang, Beijing (CN); Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 148 days.

(21) Appl. No.: 16/559,980

(22) Filed: Sep. 4, 2019

(65) Prior Publication Data

US 2020/0161909 A1    May 21, 2020

(30) Foreign Application Priority Data

Nov. 16, 2018   (CN) .......................... 201811369166.5

(51) Int. Cl.
*H02J 50/90* (2016.01)
*H02J 7/02* (2016.01)

(52) U.S. Cl.
CPC .............. *H02J 50/90* (2016.02); *H02J 7/025* (2013.01)

(58) Field of Classification Search
CPC .................................................... H02J 50/90
USPC ......................................................... 320/108
See application file for complete search history.

(56) References Cited

U.S. PATENT DOCUMENTS

| 9,973,038 | B2 * | 5/2018 | Li | H04B 5/0037 |
| 10,072,947 | B1 * | 9/2018 | Mantier | H02J 50/90 |
| 10,459,677 | B2 * | 10/2019 | Patel | H02J 50/90 |
| 10,797,505 | B2 * | 10/2020 | Chen | H02J 7/0047 |
| 2014/0002013 | A1 * | 1/2014 | Kossi | H02J 50/90 320/108 |
| 2015/0326061 | A1 * | 11/2015 | Davison | H02J 7/025 320/108 |

(Continued)

FOREIGN PATENT DOCUMENTS

| CN | 103378655 | 10/2013 |
| CN | 104034971 | 9/2014 |

(Continued)

OTHER PUBLICATIONS

1st Office Action dated Jun. 3, 2020 for Chinese Patent Application No. 201811369166.5.

*Primary Examiner* — Edward Tso
*Assistant Examiner* — Ahmed H Omar
(74) *Attorney, Agent, or Firm* — Thomas | Horstemeyer, LLP

(57) ABSTRACT

The present invention relates to the field of wireless charging technology and provides a wireless charging prompt method and device, and a wireless charging system. The method includes establishing a wireless charging connection between a transmitting device and a receiving device; acquiring relative displacement information of the transmitting device and the receiving device and charging efficiency of the transmitting device charging the receiving device in real time; and generating a displacement indication according to change of the charging efficiency with the relative displacement information, where the displacement indication indicates relative movement of the receiving device and/or the transmitting device to improve the charging efficiency.

7 Claims, 2 Drawing Sheets

(56) References Cited

U.S. PATENT DOCUMENTS

2018/0323660 A1* 11/2018 Lee .................. H02J 7/025
2021/0013750 A1* 1/2021 Kronander ............ H02J 50/80

FOREIGN PATENT DOCUMENTS

| CN | 104269908 | 1/2015 |
| CN | 106684962 | 5/2017 |

* cited by examiner

WIRELESS CHARGING PROMPT METHOD AND DEVICE, WIRELESS CHARGING SYSTEM

CROSS REFERENCE TO RELATED APPLICATIONS

The present application is based upon, and claims the benefit of and priority to, Chinese Patent Application No. 201811369166.5, filed on Nov. 16, 2018, where the entire disclosure of which is hereby incorporated by reference as a part of the present application.

TECHNICAL FIELD

The present invention relates to the field of wireless charging technologies and, more particularly, to a wireless charging prompt method and device, and a wireless charging system.

BACKGROUND

With the advent of the information age, portable electronic products have brought great convenience to people. Wireless charging technology that emerged at the same time not only reduces the inconvenience of carrying data cables for portable electronic products, but also improves dustproof and waterproof performance of portable electronic products as wireless charging technology does not need to reserve an additional charging port on the portable product.

In general wireless charging technology applications, a transmitting coil is disposed on a transmitting device and a receiving coil is disposed on a receiving device, and then, wireless charging is performed by means of magnetic induction.

It should be noted that the information disclosed in the Background section above is only for enhancing the understanding of the background of the present disclosure and thus, may include information that does not constitute prior art known to those of ordinary skill in the art.

SUMMARY

An object of the present invention is to provide a wireless charging prompt method and device, and a wireless charging system.

According to an aspect of the present invention, a wireless charging prompt method is provided, including:

establishing a wireless charging connection between a transmitting device and a receiving device;

acquiring relative displacement information of the transmitting device and the receiving device and charging efficiency of the transmitting device charging the receiving device in real time; and generating a displacement indication according to change of the charging efficiency with the relative displacement information, wherein the displacement indication is configured to indicate relative movement of the receiving device and/or the transmitting device to improve the charging efficiency.

In an exemplary embodiment of the present invention, acquiring charging efficiency of the transmitting device charging the receiving device in real time includes:

acquiring receiving power of electric quantity received by the receiving device and transmitting power of electric quantity transmitted by the transmitting device; and acquiring the charging efficiency according to a ratio of the receiving power to the transmitting power.

In an exemplary embodiment of the present invention, the method further includes:

comparing the charging efficiency with a first preset value; and generating a first prompt signal indicating that charging is normal when the charging efficiency is greater than the first preset value.

In an exemplary embodiment of the present invention, the method further includes:

comparing the charging efficiency with a second preset value; and generating a second prompt signal indicating that the charging is abnormal when the charging efficiency is less than the second preset value.

In an exemplary embodiment of the present invention, generating a displacement indication according to change of the charging efficiency with the relative displacement information includes:

determining the change of the charging efficiency in real time;

generating a displacement indication when the charging efficiency increases, wherein the displacement indication is configured to indicate that the receiving device and/or the transmitting device continue to move relative to each other along a current direction; and generating a displacement indication when the charging efficiency decreases, wherein the displacement indication is configured to indicate that the receiving device and/or the transmitting device continue to move relative to each other in a direction opposite to the current direction.

In an exemplary embodiment of the present invention, establishing a wireless charging connection between a transmitting device and a receiving device includes:

monitoring a remaining capacity of the receiving device in real time, and issuing a charging request by the receiving device when the remaining capacity of the receiving device is less than a preset remaining capacity;

receiving the charging request by the transmitting device and issuing a connection request to the receiving device; and receiving the connection request by the receiving device to establish a wireless charging connection of the transmitting device and the receiving device.

According to an aspect of the present invention, a wireless charging prompting device is provided, including: a wireless connection module, a detecting module, a position sensing module, and a first determining module. The wireless connection module is configured to establish a wireless charging connection between a transmitting device and a receiving device; the position sensing module is configured to acquire relative displacement information of the transmitting device and the receiving device; and the detecting module is configured to acquire charging efficiency of the transmitting device charging the receiving device during wireless charging in real time; the first determining module is configured to generate a displacement indication according to change of the charging efficiency with the relative displacement information, wherein the displacement indication is configured to indicate relative movement of the receiving device and/or the transmitting device to improve the charging efficiency.

In an exemplary embodiment of the present invention, the detecting module includes: a first detecting unit, a second detecting unit, and a processing unit. The first detecting unit is configured to detect receiving power of electric quantity received by the receiving device in real time; the second detecting unit is configured to detect transmitting power of electric quantity transmitted by the transmitting device; and the processing unit is configured to acquire the charging efficiency according to a ratio of the receiving power to the transmitting power.

In an exemplary embodiment of the invention, a second determining module is further included. The second determining module is configured to compare the charging efficiency with a first preset value; and generate a first prompt signal indicating that charging is normal when the charging efficiency is greater than the first preset value, compare the charging efficiency with a second preset value, and generate a second prompt signal indicating that the charging is abnormal when the charging efficiency is less than the second preset value.

According to an aspect of the present invention, a wireless charging system is provided, including: a transmitting device, a receiving device, and the wireless charging prompting device described above. The transmitting device is configured to wirelessly transmit charging energy and the receiving device is configured to receive the charging energy.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings, along with the specification, explain the principles of the present disclosure. It should be noted that the drawings in the following description show only some of the embodiments of the present disclosure, and other drawings may be obtained by those skilled in the art without departing from the drawings described herein.

DETAILED DESCRIPTION

Figure 1:
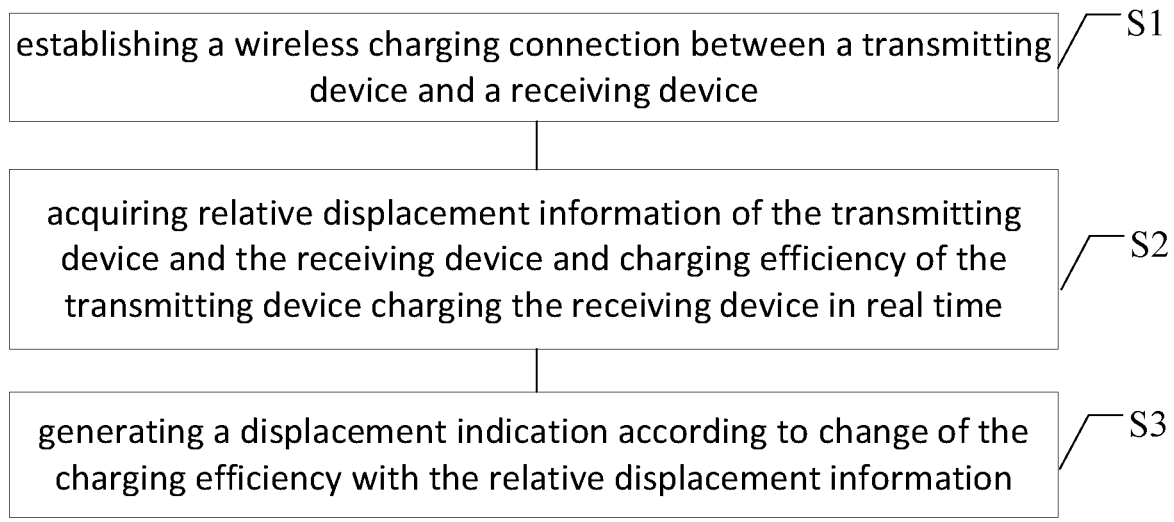
FIG. 1 is a flowchart of a wireless charging prompt method of an exemplary embodiment of the present disclosure.

Example embodiments will now be described more fully with reference to the accompanying drawings. However, the embodiments can be implemented in a variety of forms and should not be construed as being limited to the examples set forth herein. Rather, these embodiments are provided so that this disclosure will be more complete so as to convey the idea of the exemplary embodiments to those skilled in this art. The same reference numerals in the drawings denote the same or similar parts, and the repeated description thereof will be omitted.

Although the relative terms, such as "above" and "below", are used in the specification to describe the relative relationship of one component to another component of the icon, these terms are only for convenience in this specification, for example, according to a direction of the example in the drawings. It will be understood that if the device of the icon is flipped upside down, the component described "above" will become the component "below". Other relative terms, such as "high", "low", "top", "bottom", "left", "right", etc., also have similar meanings. When a structure is "on" another structure, it may mean that a structure is integrally formed on another structure, or that a structure is "directly" disposed on another structure, or that a structure is "indirectly" disposed on another structure through other structures.

The terms "a" and "the" are used to indicate the presence of one or more elements/components, etc.; the terms "include" and "have" are used to indicate an open type meaning of including and means that there may be additional elements/components/etc. in addition to the listed elements/components/etc.

The present exemplary embodiment first provides a wireless charging prompt method, as shown in FIG. 1, which is a flowchart of a wireless charging prompt method of an exemplary embodiment of the present disclosure. The method includes:

establishing a wireless charging connection between a transmitting device and a receiving device in Step S1;

acquiring relative displacement information of the transmitting device and the receiving device and charging efficiency of the transmitting device charging the receiving device in real time in Step S2; and generating a displacement indication according to change of the charging efficiency with the relative displacement information in Step S3, where the displacement indication is configured to indicate relative movement of the receiving device and/or the transmitting device to improve the charging efficiency.

The present invention provides a wireless charging prompt method and device, and a wireless charging system. The method generates a displacement indication according to the change in the charging efficiency, the displacement indication being configured to indicate the relative movement of the receiving device and/or the transmitting device to improve the charging efficiency. On one hand, the wireless charging prompt method provided by the present disclosure can give directions of relative movement of the transmitting device and/or the receiving device to provide guidance for improving charging efficiency. On the other hand, the wireless charging prompt method is simple and convenient to implement.

Each step is described in detail below:

a wireless charging connection between a transmitting device and a receiving device is established in Step S1. In this exemplary embodiment, establishing a wireless charging connection between a transmitting device and a receiving device may include: monitoring the remaining capacity of the receiving device in real time and issuing a charging request by the receiving device when the remaining capacity of the receiving device is less than preset remaining capacity; receiving the charging request by the transmitting device and issuing a connection request to the receiving device; and receiving the connection request by the receiving device to establish a wireless charging connection of the transmitting device and the receiving device. The method can automatically establish a wireless charging connection with the transmitting device when the remaining capacity of the receiving device is lower than the preset remaining capacity, and the connection request can also remind the user that there is a transmitting device for charging available nearby. The user can freely set the preset remaining capacity according to his own needs. In addition, whether the connection request is sent by the transmitting device may be determined according to the remaining capacity of the transmitting device. For example, when the remaining capacity of the transmitting device is less than a preset value, the connection request is not sent, and when the remaining capacity of the transmitting device is greater than a preset value, the connection request is sent. It should be understood that, in other exemplary embodiments, there may be more methods for establishing a wireless charging connection between a transmitting device and a receiving device, which are all within the scope of the present disclosure.

Relative displacement information of the transmitting device and the receiving device and charging efficiency of the transmitting device charging the receiving device in real time is acquired in Step S2. In the present exemplary embodiment, acquiring charging efficiency of the transmitting device charging the receiving device in real time during the wireless charging may include: acquiring receiving power of electric quantity received by the receiving device and transmitting power of electric quantity transmitted by the transmitting device; and acquiring the charging efficiency according to a ratio of the receiving power to the transmitting power.

A displacement indication according to change of the charging efficiency with the relative displacement information is generated in Step S3, where the displacement indication is configured to indicate relative movement of the receiving device and/or the transmitting device to improve the charging efficiency. In the exemplary embodiment, generating a displacement indication according to change of the charging efficiency with the relative displacement information may include: determining the change of the charging efficiency in real time; generating a displacement indication when the charging efficiency increases, where the displacement indication is configured to indicate that the receiving device and/or the transmitting device continue to move relative to each other along current direction; and generating a displacement indication when the charging efficiency decreases, where the displacement indication is configured to indicate that the receiving device and/or the transmitting device continue to move relative to each other in a direction opposite to the current direction. For example, when the receiving device moves to the right relative to the transmitting device, if the charging efficiency increases, a displacement indication is generated that indicates that the receiving device continues to move to the right or the transmitting device moves to the left. If the charging efficiency decreases, a displacement indication is generated that indicates that the receiving device continues to move to the left or the transmitting device moves to the right. The displacement indication can be transmitted by means of an arrow or a voice in some embodiments.

In the above wireless charging prompt method, the displacement indication can only be used to indicate how the transmitting device and/or the receiving device move to obtain higher charging efficiency, but the displacement indication does not indicate whether the current charging efficiency is normal. In the exemplary embodiment, the wireless charging prompt method may further include: comparing the charging efficiency with a first preset value and generating a first prompt signal indicating that charging is normal when the charging efficiency is greater than the first preset value; and comparing the charging efficiency with a second preset value and generating a second prompt signal indicating that the charging is abnormal when the charging efficiency is less than the second preset value. The first preset value may be set as a critical value of the charging abnormality, and, when the charging efficiency is less than the first preset value, this indicates that the charging is abnormal; the second preset value may be set as the critical value of the charging normal, and, when the charging efficiency is greater than the second preset value, this indicates that the charging is normal; a buffer area is between the first preset value and the second preset value, and less efficient charging can be performed between the receiving device and the transmitting device in the buffer area. The user can set the first preset value and the second preset value according to requirements. For example, the first preset value may be 20%, and the second preset value may be 70%, although other preset values can be employed. During the movement of the transmitting device and/or the receiving device by the user, the wireless charging prompt method may prompt the user whether the charging efficiency is normal through the first prompt signal and the second prompt signal. It should be understood that, in other exemplary embodiments, the wireless charging prompt method may also provide numerical information indicating charging efficiency in real time, which are all within the scope of protection of the present disclosure.

Figure 2:
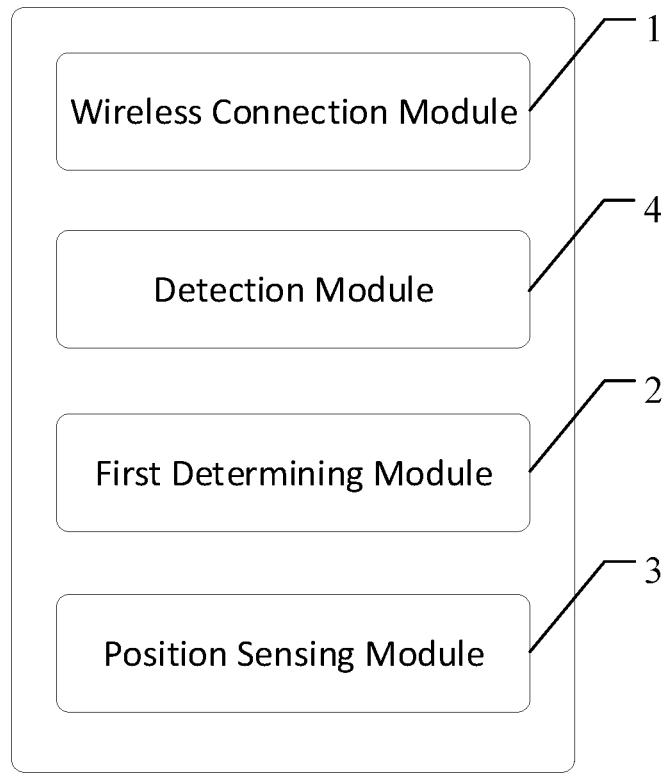
FIG. 2 is a schematic structural diagram of a wireless charging prompt device of an exemplary embodiment of the present disclosure.

The exemplary embodiment further provides a wireless charging prompting device, as shown in FIG. 2, which is a schematic structural diagram of a wireless charging prompt device of an exemplary embodiment of the present disclosure. The device includes: a wireless connection module 1, a detection module 4, a first determining module 2, and a position sensing module 3. The wireless connection module 1 is configured to establish a wireless charging connection between a transmitting device and a receiving device. The detection module 4 is configured to acquire charging efficiency of the transmitting device charging the receiving device during wireless charging in real time. The position sensing module 3 is configured to acquire relative displacement information of the transmitting device and the receiving device. The first determining module 2 is configured to generate a displacement indication according to a change of charging efficiency with the relative displacement information, where the displacement indication indicates relative movement of the receiving device and/or the transmitting device to improve the charging efficiency.

According to an exemplary embodiment of the present disclosure, the respective component (e.g., the modules, units, etc.) may be constituted by a corresponding circuit, for example, the detection module 4 may include a power metering circuit, a signal conversion circuit, a computing circuit, and the like that are respectively configured. Alternatively, the various components may also be implemented by a processor, logic circuitry, etc. For example, the detection module 4 may include a processor that collects and/or receives power signals and performing computing on the power signal. Further, sub-circuits performing corresponding operations and/or sub-logic circuitry/processor configured to perform corresponding operation may be referred to as corresponding "units", such as a first detecting unit 21, a second detecting unit 22, and a processing unit 23 that will be described in further detail hereinafter. Other components of the present disclosure may also be implemented in a similar manner and will not be described again herein.

Figure 3:
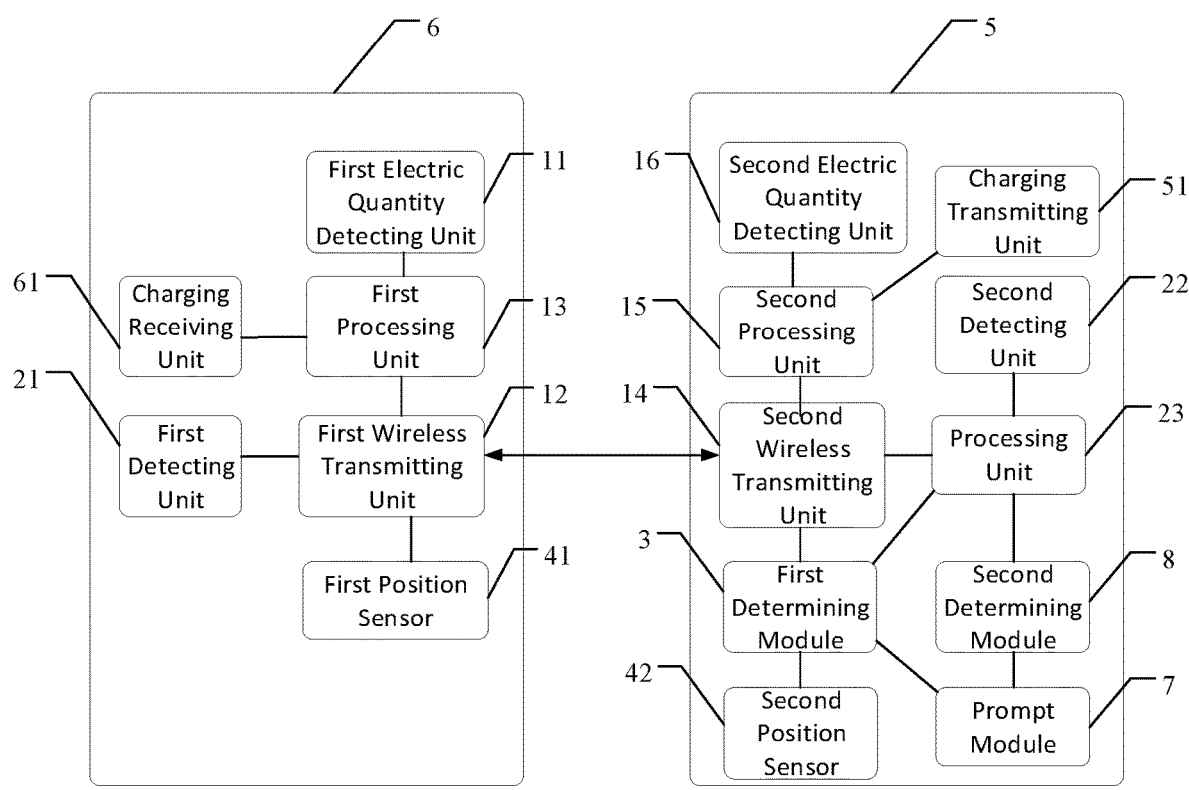
FIG. 3 is a schematic structural diagram of a wireless charging system of an exemplary embodiment of the present disclosure.

The exemplary embodiment further provides a wireless charging system, as shown in FIG. 3, which is a schematic structural diagram of a wireless charging system of an exemplary embodiment of the present disclosure. The system includes a transmitting device 5, a receiving device 6, and the wireless charging prompting device described above. The transmitting device is configured to wirelessly transmit charging energy and the receiving device is configured to receive the charging energy.

In the exemplary embodiment, as shown in FIG. 3, the wireless connection module 1 may include a first electric quantity detecting unit 11, a first wireless transmitting unit 12, a first processing unit 13, a second wireless transmitting unit 14, a second processing unit 15, and a second electric quantity detecting unit 16. The transmitting device 5 may include a charging transmitting unit 51 for transmitting the electric quantity, and the receiving device 6 may include a charging receiving unit 61 for receiving the electric quantity. The first electric quantity detecting unit 11, the first wireless transmitting unit 12, and the first processing unit 13 may be disposed on the receiving device 6, and the first processing unit 13 is coupled to the first electric quantity detecting unit 11, the first wireless transmitting unit 12, and the charging receiving unit 61, respectively. The second wireless transmitting unit 14, the second processing unit 15, and the second electric quantity detecting unit 16 may be disposed on the transmitting device 5, and the second processing unit 15 is coupled to the second wireless transmitting unit 14, the second electric quantity detecting unit 16, and the charging transmitting unit 51, respectively. The first electric quantity detecting unit 11 is configured to detect the electric quantity of the receiving device 6 and, when the electric quantity detected by the first electric quantity detecting unit 11 is less than the preset electric quantity, the first electric quantity detecting unit 11 sends a low electric quantity signal to the first processing unit 13, then the first processing unit 13 issues a charging request by the first wireless transmitting unit 12, and, when the second wireless transmitting unit 14 receives the charging request sent by the first wireless transmitting unit 12, the charging request is sent to the second processing unit 15. While the second electric quantity detecting unit 16 detects the electric quantity of the transmitting device 5, and when the electric quantity detected by the second electric quantity detecting unit 16 is greater than a preset electric quantity, the second electric quantity detecting unit 16 sends a high electric quantity signal to the second processing unit 15, and, at the same time the second processing unit 15 transmits a connection request to the first wireless transmitting unit 12 through the second wireless transmitting unit 14, and simultaneously turns on the charging transmitting unit 51. When the first processing unit 13 receives the connection request through the first wireless transmitting unit 12, the charging receiving unit 61 is turned on, thereby establishing a wireless charging connection between the receiving device 6 and the transmitting device 5.

In the present exemplary embodiment, as shown in FIG. 3, the position sensing module 3 may include a first position sensor 41 and a second position sensor 42. The first position sensor 41 can be disposed on the receiving device 6, and the second position sensor 42 can be disposed on the transmitting device 5. The relative displacement information of the receiving device 6 and the transmitting device 5 can be acquired by the first position sensor 41 and the second position sensor 42.

In the exemplary embodiment, as shown in FIG. 3, the detection module 4 may include: a first detecting unit 21, a second detecting unit 22, and a processing unit 23. The first detecting unit 21 is configured to detect receiving power of electric quantity received by the receiving device 6 in real time; the second detecting unit 22 is configured to detect transmitting power of electric quantity transmitted by the transmitting device 5; and the processing unit 23 is configured to acquire the charging efficiency according to a ratio of the receiving power to the transmitting power. The first detecting unit 21 may be disposed on the receiving device 6, the second detecting unit 22 may be disposed on the transmitting device 5, and the processing unit 23 may be disposed on the transmitting device 5 and coupled to the second wireless transmitting unit 14. The first detecting unit 21 can be coupled to the first wireless transmitting unit 12, so that receiving power of electric quantity received by the receiving device 6 is transmitted to the processing unit 23 through the first wireless transmitting unit 12 and the second wireless transmitting unit 14. The processing unit 23 can be directly coupled to the second detecting unit 22 to acquire the transmission power. The first determining module 3 and the processing unit 23 can be disposed on the same device, and is coupled to the processing unit 23 and the second wireless transmitting unit 14. The first position sensor 41 may be coupled to the first wireless transmitting unit 12, thereby transmitting the position information of the receiving device 6 to the first determining module 3 through the first wireless transmitting unit 12 and the second wireless transmitting unit 14. The second position sensor 42 may be directly coupled to the first determining module 2 to transmit the position information of the transmitting device 5 to the first determining module 3.

In the exemplary embodiment, as shown in FIG. 3, the wireless charging device may further include a second determining module 8. The second determining module 8 may be disposed on the transmitting device 5 and coupled to the processing unit 23, which is configured to compare the charging efficiency with a first preset value and generate a first prompt signal indicating that charging is normal when the charging efficiency is greater than the first preset value, and also generate a second prompt signal indicating that the charging is abnormal when the charging efficiency is less than the second preset value.

In the exemplary embodiment, as shown in FIG. 3, the wireless charging device may further include a prompt module 7. The prompt module 7 may be disposed on the transmitting device 5 and coupled to the first determining module 3 and the second determining module 8, and configured to communicate the displacement indication, the first prompt signal, and the second prompt signal described above. For example, the prompt module 7 can be a display, a speaker, or the like.

It should be understood that, in other exemplary embodiments, the processing unit 23, the first determining module 3, the second determining module 8, and the prompt module 7 may also be disposed on the receiving device 6, which are all within the protection scope of the present disclosure. The prompt module 7 can share the display and the speaker of the receiving device or the transmitting device.

In an exemplary embodiment, the wireless charging system may include a first terminal and a second terminal, and the receiving device may be included in the first terminal which may be a portable electronic product, such as a mobile phone, a tablet computer, an earphone, or the like. The transmitting device may be included in the second terminal which may a wireless charging device or a portable electronic product, such as a mobile phone, a tablet computer, or the like. Therefore, the second terminal can wirelessly charge the first terminal by using the wireless charging system. For example, another mobile phone can be wirelessly charged by one mobile phone, the earphone can be wirelessly charged by a mobile phone, and a mobile phone may be wirelessly charged by a wireless charging device, which is not listed herein.

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It is to be understood that the present disclosure is not limited to the precise structures that have been described above and shown in the drawings, and various modifications and changes can be made without departing from the scope thereof. The scope of the present disclosure is to be limited only by the appended claims.

What is claimed is:

1. A wireless charging prompt method, comprising:
   establishing a wireless charging connection between a transmitting device and a receiving device;
   acquiring, in real time, by at least one of the transmitting device and the receiving device, relative displacement direction of the transmitting device and the receiving device and a charging efficiency of the transmitting device charging the receiving device; and
   generating, by at least one of the transmitting device and the receiving device, a displacement indication according to a change of the charging efficiency with the relative displacement direction, wherein the displacement indication indicates a relative movement between the receiving device and the transmitting device to improve the charging efficiency, wherein generating the displacement indication according to the change of the charging efficiency with the relative displacement direction comprises:
   determining the change of the charging efficiency in real time;
   generating the displacement indication when the charging efficiency increases, wherein the displacement indication is configured to indicate that at least one of the receiving device and the transmitting device continue to move relative to each other along a current direction; and
   generating the displacement indication when the charging efficiency decreases, wherein the displacement indication is configured to indicate that at least one of the receiving device and the transmitting device continue to move relative to each other in a direction opposite to the current direction;
   comparing the charging efficiency with a first preset value; and generating a first prompt signal indicating that charging is normal when the charging efficiency is greater than the first preset value; and
   comparing the charging efficiency with a second preset value; and generating a second prompt signal indicating that the charging is abnormal, when the charging efficiency is less than the second preset value;
   wherein a buffer area is between the first preset value and the second preset value, and less efficient charging is performed between the receiving device and the transmitting device in the buffer area.

2. The wireless charging prompt method according to claim 1, wherein acquiring charging efficiency of the transmitting device charging the receiving device in real time comprises:
   acquiring a receiving power of electric quantity received by the receiving device and a transmitting power of electric quantity transmitted by the transmitting device; and
   acquiring the charging efficiency according to a ratio of the receiving power to the transmitting power.

3. The wireless charging prompt method according to claim 1, wherein the establishing a wireless charging connection between the transmitting device and the receiving device comprises:
   monitoring a remaining capacity of the receiving device in real time, and issuing a charging request by the receiving device when the remaining capacity of the receiving device is less than a preset remaining capacity;
   receiving the charging request by the transmitting device, and issuing a connection request to the receiving device; and
   receiving the connection request by the receiving device to establish the wireless charging connection of the transmitting device and the receiving device.

4. A wireless charging prompting device, comprising:
   a wireless connection module configured to establish a wireless charging connection between a transmitting device and a receiving device;
   a position sensing module configured to acquire relative displacement direction of the transmitting device and the receiving device;
   a detecting module configured to acquire a charging efficiency of the transmitting device charging the receiving device in real time; and
   a first determining module configured to generate a displacement indication according to change of the charging efficiency with the relative displacement direction, wherein the displacement indication indicates a relative movement of at least one of the receiving device and the transmitting device to improve the charging efficiency, wherein the first determining module is further configured to:
   determine the change of the charging efficiency in real time;
   generate the displacement indication when the charging efficiency increases, wherein the displacement indication is configured to indicate that at least one of the receiving device and the transmitting device continue to move relative to each other along a current direction; and
   generate the displacement indication when the charging efficiency decreases, wherein the displacement indication is configured to indicate that at least one of the receiving device and the transmitting device continue to move relative to each other in a direction opposite to the current direction;
   a second determining module configured to: compare the charging efficiency with a first preset value, and generate a first prompt signal indicating that charging is normal when the charging efficiency is greater than the first preset value; and compare the charging efficiency with a second preset value and generate a second prompt signal indicating that the charging is abnormal when the charging efficiency is less than the second preset value, and
   wherein a buffer area is between the first preset value and the second preset value, and less efficient charging is performed between the receiving device and the transmitting device in the buffer area.

5. The wireless charging prompting device according to claim 4, wherein the detecting module comprises:
   a first detecting unit configured to detect a receiving power of electric quantity received by the receiving device in real time;

a second detecting unit configured to detect a transmitting power of electric quantity transmitted by the transmitting device; and a processing unit configured to acquire the charging efficiency according to a ratio of the receiving power to the transmitting power.

6. A wireless charging system, comprising:

a transmitting device configured to wirelessly transmit charging energy;

a receiving device configured to receive the charging energy; and a wireless charging prompting device, comprising:

a wireless connection module configured to establish a wireless charging connection between the transmitting device and the receiving device;

a position sensing module configured to acquire relative displacement direction of the transmitting device and the receiving device;

a detecting module configured to acquire charging efficiency of the transmitting device charging the receiving device in real time; and a first determining module configured to generate a displacement indication according to change of the charging efficiency with the relative displacement direction, wherein the displacement indication indicates a relative movement of at least one of the receiving device and the transmitting device to improve the charging efficiency, wherein the first determining module is further configured to:

determine the change of the charging efficiency in real time;

generate the displacement indication when the charging efficiency increases, wherein the displacement indication is configured to indicate that at least one of the receiving device and the transmitting device continue to move relative to each other along a current direction; and generate the displacement indication when the charging efficiency decreases, wherein the displacement indication is configured to indicate that at least one of the receiving device and the transmitting device continue to move relative to each other in a direction opposite to the current direction, a second determining module configured to: compare the charging efficiency with a first preset value, and generate a first prompt signal indicating that charging is normal when the charging efficiency is greater than the first preset value; and compare the charging efficiency with a second preset value and generate a second prompt signal indicating that the charging is abnormal when the charging efficiency is less than the second preset value, and wherein a buffer area is between the first preset value and the second preset value, and less efficient charging is performed between the receiving device and the transmitting device in the buffer area.

7. The wireless charging system according to claim 6, wherein the detecting module comprises:

a first detecting unit configured to detect a receiving power of electric quantity received by the receiving device in real time;

a second detecting unit configured to detect a transmitting power of electric quantity transmitted by the transmitting device; and a processing unit configured to acquire the charging efficiency according to a ratio of the receiving power to the transmitting power.

* * * * *